Figures 1, 2:
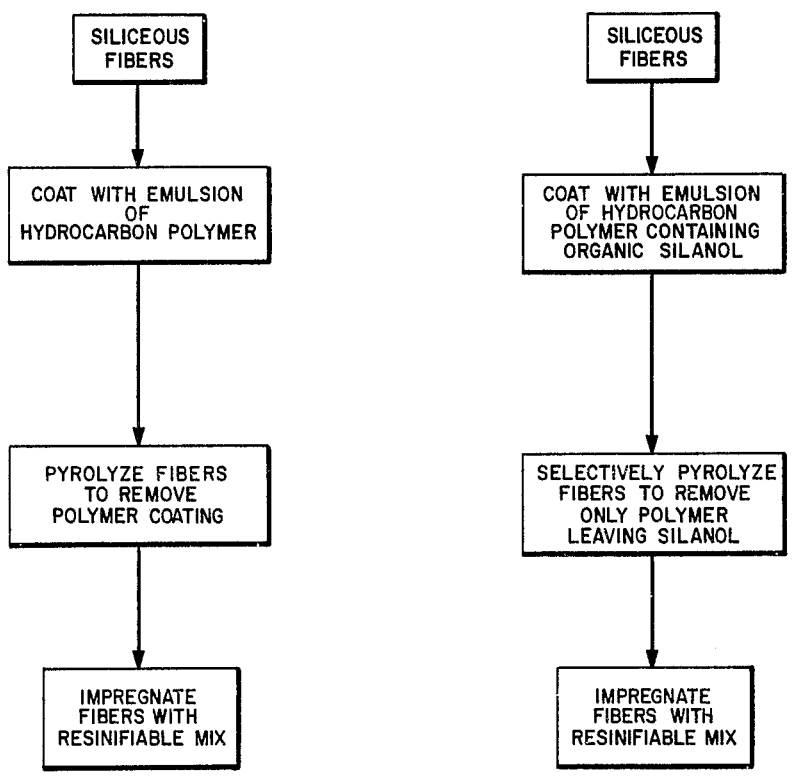

Jan. 25, 1966  B. M. VANDERBILT  3,231,540
POLYMERIC SIZES FOR SILICEOUS FIBROUS MATERIALS AND
REINFORCED PLASTIC COMPOSITIONS PRODUCED THEREFROM
Filed Aug. 17, 1962

Byron M. Vanderbilt  INVENTOR

BY

PATENT ATTORNEY

United States Patent Office 3,231,540
Patented Jan. 25, 1966

3,231,540
POLYMERIC SIZES FOR SILICEOUS FIBROUS MATERIALS AND REINFORCED PLASTIC COMPOSITIONS PRODUCED THEREFROM
Byron M. Vanderbilt, Westfield, N.J., assignor to Esso Research and Engineering Company, a corporation of Delaware
Filed Aug. 17, 1962, Ser. No. 217,520
11 Claims. (Cl. 260—41.5)

The present invention relates to the treatment of siliceous fibrous materials, particularly those employed as reinforcing agents in plastic compositions and to their pretreatment with polymeric sizes, such as the homopolymers of certain isoolefins and the copolymers of these isoolefins with minor amounts of certain conjugated diolefins.

More particularly, the present invention relates to a combined method of applying a novel size to glass fibers with or without the simultaneous application of a chemical coupling agent, preferably a silanol, and to the removal by pyrolysis of the polymeric size without adversely affecting the silanol or the glass fiber, so that it is possible to ultimately use the glass fibers after processing into rovings and/or glass cloth as reinforcing agents in the formation of reinforced thermoset compositions.

The present application is a continuation-in-part of my copending application Ser. No. 752,183, filed July 31, 1958, now abandoned.

It is well known in the art to prepare reinforced plastics in which reinforcing agents, such as glass, asbestos, finely comminuted silicas, aluminas, silicates and the like are impregnated with thermosetting polymeric plastics, such as the unsaturated polyesters, epoxy resins, polydiolefin resins and various other thermosetting resins, and the like. In the past, however, attempts have been made to employ numerous sizes or binding agents to the reinforcing agents, such as glass fibers to protect the fibers during handling and processing into multiple end rovings, multifilament strands, and cloth. Because of the delicate nature of the fine individual fibers, some coating or sizing must be applied almost immediately after the formation of the individual fiber in order to protect it from breakage and from damage of its surface during its subsequent processing. Sizes preferably employed for manufacturing rovings, matting, strand to be woven to cloth and chopped glass fibers have included starch-oil, polyvinyl acetate and the copolymers formed from using a major amount of styrene and a minor amount of butadiene. These materials have not been completely satisfactory when the glass fibers have been used in plastics. When using starch-oil a cleaning treatment by burning is required in order to remove the starch-vegetable oil so that the resin can properly wet out the glass. This high temperature treatment causes severe damage to the fibers causing great loss in strength. In the case of the styrene-butadiene copolymer and polyvinyl acetate, they are usually removed by solution in the impregnating resin. However, this contaminates the resin, resulting in a lower strength reinforced plastic than when clean glass is used. Furthermore, the solution of such a sizing in the resin may be incomplete thus resulting in poor contact between the plastic and the reinforcement. Also in burning off the starch-oil size some carbonaceous residue is usually left on the glass, resulting in an inferior bonding between the resin, coupling agent, and the fibrous reinforcing agents in the final reinforced plastic. Additionally, a coupling agent, such as an unsaturated organic silane or silanol, at some stage in the process, must be applied to the glass fibers prior to its use in the reinforced plastic. When polyvinyl acetate or the like is used, the coupling agent is added along with the binder when the glass filament is formed. If starch-oil or the like is used and the sizing removed by burning, it is necessary to add the coupling agent as a separate operation to the heat cleaned glass. This is not only an expensive operation, but further damage is done to the glass fibers during this finishing operation.

It has now been discovered that certain sizes can be applied to siliceous fibrous materials used ultimately as reinforcing agents and that these sizes can be removed by pyrolysis under controlled thermal conditions without any damage to the tensile strength of the siliceous fibers. Usually such sizings are removed just before the siliceous fibers are impregnated with a resinifiable thermosetting polymerizable mix. It is now possible through the use of the novel size hereinafter disclosed, to protect the siliceous fibers during their formation and subsequent processing into fibrous articles, such as rovings and cloth and yet to have a strong final reinforced plastic composition with an improved bonding and adhesion between the thermoset resin and the siliceous fibrous reinforcing agents. As the monofilament glass fiber is drawn through a bushing from the molten glass, it is contacted with an aqueous dispersion or an organic solvent solution of a homopolymer of a $C_4$ to $C_7$ isoolefin, i.e., a branched chain aliphatic hydrocarbon compound containing a single ethylenic linkage per molecule, or it is contacted with an aqueous dispersion or organic solvent solution of a copolymer composed of at least 70 wt. percent of a $C_4$ to $C_7$ isoolefin monomer copolymerized with up to 30 wt. percent of a $C_4$ to $C_{10}$ conjugated diolefin monomer. The monofilament glass fibers so coated and impregnated with the aforementioned size are then fabricated into rovings, cloth, etc., in the usual manner. Mild heating of the siliceous fibrous reinforcing agents just prior to their impregnation with the conventional thermosetting polymerizable mixes results in the complete pyrolysis of these hydrocarbon polymeric sizes at relatively low temperatures leaving the siliceous surfaces clean and capable of finally forming tight adhesive bonds between these surfaces and the resinifiable thermosetting polymerizable mixes. The mixes, of course, as is conventional in the art, are usually cured with the fibrous fillers incorporated therein or they are cured in alternate layers of resinifiable mixes and glass cloth to form many plied laminates of unitary reinforced structure.

Additionally, as before stated, an unsaturated organic silanol or its precursor, for example, an unsaturated organic halo silane, treated with water, to at least partially convert the halogens to hydroxyl groups, may be employed simultaneously with the polymeric size for initially coating the freshly formed glass fibers. It is not necessary, however, that this be done. While the silane and/or silanol may be actually included in the polymeric size solution and emulsion and applied simultaneously with the size, the polymeric size or emulsion initially may be free of the silane or silanol. In either case, the subsequent heat treatment to pyrolyze and remove the polymeric size is so selected as to temperature and time of heating as to remove only the polymeric size leaving the silanol undamaged on the siliceous surfaces.

Finally, an aqueous emulsion or dispersion of the polyisoolefin is prepared in the presence of a conventional surfactant, in which between about 0.5 wt. percent and about 5 wt. percent of the solid polyisoolefin is employed. If an organic solvent solution of the polyisoolefin is employed, generally the concentration of polyisoolefin will be between about 0.1 wt. percent and about 3.0 wt. percent. Preferably, and particularly in the case of the simultaneous emulsion treatment of the glass monofilament, an aqueous emulsion or dispersion is employed when it is desired to simultaneously treat the filament with a polymeric size and with a silanol. If a halosilane is used as the source of the silanol, it is hydrolyzed in water and the by-product HCl neutralized with caustic soda or other suitable alkali prior to addition to the dispersion. If a silane ester is used, such as vinyl tri-methoxyethoxy silane, it may be hydrolyzed separately or directly in the aqueous dispersion. In the event, however, the ultimate material contacting the siliceous monofilament is at least partially converted to a silanol brought about by either the simultaneous hydrolysis and treatment by means of an aqueous dispersion or by a preliminary pretreatment to convert the silane to the silanol. In either case, it is believed that the silanol or its condensation products is ultimately the substance attached to the surface of the glass fibers. The use of an organic solvent solution may be used where the coupling agent, namely the unsaturated organic silane or silanol, is simultaneously applied to the glass fibers with the novel polymeric size, but an aqueous solution is preferred.

The siliceous fibrous materials used ultimately as reinforcing agents may be glass fibers, fibers produced from molten rock (rock wool), fused quartz fibers and the like. The amount of siliceous fibrous reinforcing agents employed relative to the amount of the final reinforcing plastic composition usually ranges between about 20 and about 80% of the final reinforced plastic, preferably between about 35 and about 70% of the final reinforced plastic.

In the event that the silanol (which term is intended to include the silanes which are ultimately converted, by reaction with water, to silanols before, or simultaneous with, their contact with the siliceous fibrous surfaces) is not incorporated into the polymeric size at the time the polymeric size is applied initially to the glass fiber, and in order to achieve an improved adhesion between the siliceous surfaces and the final thermoset resin, the silanol is mixed, to the extent of between about 0.05 wt. percent and about 4 wt. percent, in the thermosetting polymerizable resinifiable mix. It is, of course, also within the scope of the present invention to incorporate small amounts of the silanol both in the polymeric size composition and in the final impregnating thermosetting resinifiable polymerizable mix. The silanol is incorporated in either the polymeric size dispersion or solution or the thermosetting resinifiable polymerizable mix.

The silanols which are useful in practicing the present invention may be any of those which are known conventionally to be applicable for the treating of glass fibers and which are known to function as coupling agents between the siliceous fibrous surfaces and the polymerizable mixes which are concurrently employed for impregnating glass cloth, mattings in other fibrous articles made of glass fibers, or other siliceous fibrous materials. The present invention is not limited to the selection of any specific halosilane or silane ester or corresponding silanol derivative thereof, except that it has been found that the ultimate silanol coating on the siliceous surfaces must contain at least one aliphatic hydrocarbon radical attached to the silicon atom which contains at least one ethylenically unsaturated double bond. As representative of the type of unsaturated organic silanols which may be employed, although the invention is not limited to these particular ones, the silanols employed can be represented by the following formula:

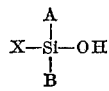

wherein X is an alkenyl radical such as vinyl, crotyl, allyl, or cyclohexenyl, A and B are independently hydroxyl, chloro, bromo, or lower alkoxy for example, methoxy, ethoxy, propoxy, alkenyl, or lower alkyl such as methyl, ethyl or propyl. Also simple substituted derivatives of silanols are effective coupling agents. These correspond to the above formula where X is a substituted lower alkyl group, for example Y—X— wherein X is an alkyl and Y is a substituent such as amino, mercapto, hydroxyl, cyano, carboxy, epoxy, quinoyl, oxime or sulfo.

Specifically the following compounds when hydrolyzed yield silanols and are satisfactorily employed in connection with the present invention. The hydrolysis products of: vinyl triethoxy silane, divinyl dimethoxy silane, allyl triethoxyl silane, gamma aminopropyl triethoxy silane, gamma mercapto propyl triethoxy silane, methacrylopropyl trimethoxy silane, vinyl tris-methoxy ethoxy silane, cyclohexenyl trichlorsilane, diethyl dichloro silane, the silanes specifically set forth in U.S. Patent 2,859,198 (cols. 2 and 3) and incorporated herein by reference. Other specific silanes are set forth in the following specific examples. Sizes within the purview of this invention comprise homopolymers of isoolefins and copolymers of an isoolefin with another monomer such as a multiolefin in an emulsion or in a solution. Polyisoolefins, e.g., polyisobutylene, can be prepared by the polymerization of isobutylene in the presence of suitable catalysts, preferably inorganic halides, e.g. boron fluoride, phosphorus trifluoride, phosphorus pentafluoride, aluminum chloride, and aluminum bromide. The polymerization is a strongly exothermic reaction, and it is necessary to keep the temperature below 5° C. during the reaction. Solvents, e.g. pentane, may be present during the reaction. The resulting product is very viscous and can be sticky, semisolid, or solid with rubber-like consistency. The preparation of this polymer is described in U.S. Patent 2,130,507 which is incorporated herein by reference.

An isoolefin-multiolefin copolymer is also preferred as a component for the size and can be prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, such as isobutylene or 2-methyl-1-butene. The multiolefin, in general is a $C_4$ to $C_{10}$ conjugated diolefin such as isoprene, butadiene, or piperylene. The preferred polymer is obtained by reacting 95 to 99.5% by weight of isobutylene with 0.5 to 5% by weight of isoprene. Mixture of monomers, preferably with 1to 5 volumes of inert diluent, e.g. methyl chloride, should be cooled to a temperature between 0 and —200° C., and it is preferred that the temperature range be between —60° and —130° C. The cold mixture is polymerized by the addition of a Friedel-Crafts catalyst, preferably aluminum chloride catalyst in a liquid or dissolved form, in conjunction with vigorous agitation. The amount of catalyst is generally about 0.02 to 1.0% by weight of the mixed olefins. The polymerization reaction is rapid and the polymer precipitates out of the solution in the form of a slurry flocculent white solid. The polymer, which is recovered and dried, has a Staudinger molecular weight between 20,000 and 150,000 preferably 45,000 to 60,000; and an iodine number between 0.5 and 50, preferably between 1 and 15. The preparation of this copolymer is described in U.S. Patent 2,356,128 which is also incorporated herein by reference.

As previously stated, the size can comprise either of the types of polymers discussed above in emulsion or solution. If the size is an aqueous emulsion, the polymer should be less than 10 parts, preferably 1 to 3 parts, per 100 parts of water. It is advantageous to incorporate 2 to 12 parts of a nonionic emulsifier based on 100 parts of polymer. An effective emulsifier is a polyoxy ethylated octyl or nonyl phenol where the number of ethylene oxide units is 8 to 10. If the size is a solution, the polymer should also be in the range of 1 to 3 parts per 100 parts of solvent. Suitable solvents include hydrocarbons such as hexane or heptane, esters, and ethers, or mixtures thereof.

The size can be applied to the clean or freshly drawn reinforcing agent, e.g., glass fibers, by any known method. For example, the glass fibers may be passed through the emulsion or solution until a suitable amount of size is incorporated thereon. The preferred amount is between 0.25% and 1.0%. The coated reinforcing agent is then dried at a temperature between 60° and 300° F. for 1 minute to 10 hours, depending upon the temperature and the type of glass being coated. The size remains on the glass fibers until after the fibers are fabricated into rovings, cloth, matting, etc., the size is removed by decomposition. This can be accomplished by mild heating at a temperature between 500° and 900° F. The preferred range is 600 to 700° F. and the especially preferred range is 625 to 650° F. The residence time of the glass fibers at these temperatures is between 5 seconds and about 2 minutes, preferably when employing the temperature range of 600 to 700° F. of between about 10 and about 20 seconds. The isoolefin polymer or copolymer is removed by this pyrolysis process and evolves gaseous decomposition products. At higher temperature where actual combustion may take place, the glass does not reach as high a temperature as when a slower burning material such as starch-oil is employed. Furthermore, employing the isoolefin polymer sizing and heat cleaning at a temperature below about 800° F. allows the silane finish to remain on the glass unchanged. This is further enhanced by care in employing a nonoxidizing atmosphere during the heating operation. If, on the other hand, oxygen or air is present and one employs a sufficiently high temperature so that combustion takes place, the vinyl silane is destroyed and must be applied or reapplied after the burning operation. This is always the practice when employing the old technique of starch-oil sizing followed by heat cleaning by burning.

The reinforcing agent with the size removed is immediately laminated with a resinifiable polymeric mix. This mix generally comprises a curable polymer and a crosslinking agent with or without a catalyst. Curable polymers in the mix within the purview of this invention comprise the conventional thermosetting resins, e.g. polydiolefins, polyesters, epoxies, phenolics, melamines, and silicones. However, the preferred polymers comprise the drying oils obtained by polymerizing conjugated diolefins having 4 to 6 carbon atoms per molecule with a crosslinking agent, such as a styrene, and a catalyst, such as an organic peroxide. Polyesters may be substituted for these polymeric oils, but are somewhat less desirable for many applications where high moisture resistance is desired.

The preferred polymers for use in this invention are prepared from diolefins, particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers such as styrene, acrylonitrile, methyl vinyl ketone, or with styrenes having alkyl groups substituted on the ring (paramethyl styrene, dimethyl styrene, etc.), may also be used. The synthetic polymeric oils may be prepared by mass polymerization, either in the presence of a hydrocarbon soluble conventional organic peroxide catalyst or in the presence of an alkali metal such as metallic sodium.

An especially preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization boils between about −15° C. and 200° C., in amounts ranging from 100 to 500 parts per 100 parts of monomers; preferred diluents are aliphatic hydrocarbons such as solvent naphtha or straight-run mineral spirits such as Varsol. A codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent (based on sodium) of an alcohol such as methanol, isopropanol, or an amyl alcohol in order to overcome the initial induction period. The resulting product may vary in viscosity from 0.5 to 20 poises as a 50% solution in Varsol, and may be altered as desired for use in the curable liquid mix. An especially suitable polydiolefin oil for reinforced plastics is the one with a viscosity between 1.2 to 1.5 poises. The preparation of this oil is described in U.S. Patent 2,762,851, which is incorporated herein by reference.

The polyesters which may be used in this invention are well known. They may be derived by the condensation of compounds containing hydroxyl and carboxyl groups and have a typical structure as below:

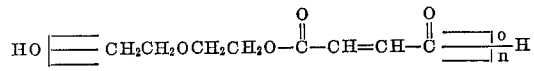

where $n$ represents the degree of polymerization. A typical unsaturated polyester may be prepared by reacting an unsaturated polybasic acid, or its anhydride such as maleic anhydride, with a polyhydric alcohol such as diethylene glycol. Another suitable polyester is a fumaric acid ester of alkylene oxide condensate of bisphenol-A. The reaction may proceed at elevated temperature. It is these unsaturated polyesters that can be incorporated in this invention.

The resinifiable mix, in addition to a curable polymer, e.g. a polydiolefin, generally has a crosslinking agent and a catalyst included therein. Crosslinking agents may be added to the curable polymer, e.g. a polydiolefin oil, to impart an effective crosslinking of the resin. Such agents include the following compounds: vinyl aromatics as styrene and vinyl toluene; halo styrenes; vinyl naphthalenes; alkyl acrylates and methacrylates; and allyl esters. Preferred compounds are diallylphthalate and the styrenes. The especially preferred compound is vinyl toluene or monomethyl styrene. The crosslinking agent should be incorporated in the range of 0 to 60% of the curable liquid mix, preferably 30 to 50%. A catalyst is incorporated in the range of 0.2 to 10 parts, preferably 1 to 3 parts, and should be of the free radical or organic peroxide type. Preferred catalysts are dicumyl peroxide and/or ditertiary butyl peroxide.

The reinforcing agent, with the size removed, can be immediately impregnated with the resinifiable polymer mix. Laminates of a plurality of siliceous fibrous reinforcing elements in layers impregnated with a thermosetting resinifiable mix and cured are readily produced. Layers of cloth and resin; fibers embedded in a resin; and fibers saturated with resin and formed in a hollow cylindrical pipe are typical laminates obtained. Lamination can be accomplished by any known method. One method used in the manufacture of solid rectangular sheets, is to form layers of curable polymer mix and glass fiber cloth. After the desired thickness is obtained, the sheet is cured to a unitary reinforced plastic. A second method can be used for the manufacture of cylindrical hollow pipes. Glass fibers can be dipped in the curable polymer mix and wound in several layers about a steel mandrel. This can be accomplished by any method. In one method, the fiber rovings, e.g. glass fibers, are wound at an angle to the axis of the mandrel circumferentially in superimposed layers to form a peripheral shell of the pipe (U.S. Patent 2,714,414). After the desired shape is obtained, the wrapping can be cured to form the unitary rigid pipe.

The envelopment of resinifiable polymer and reinforcing agent can be subsequently cured to a reinforced plastic. A suitable method is by baking in a press mold at a temperature range of 250° to 400° F. for between 5 minutes and 2 hours under pressures from 0 to 1500 p.s.i.g. It may also be advantageous to have a post cure between 290° and 350° F. for 1 to 24 hours.

The accompanying drawings shows schematically by means of block diagrams two variations of the invention. FIGURE 1 shows the sizing of siliceous fibers initially with pyrolyzable hydrocarbon polymer emulsion alone followed by the removal of the size by pyrolysis before the fibers are impregnated with a resinifiable mix. FIGURE 2 shows the same process treatment of siliceous fibers as the diagram in FIGURE 1 except that the polymeric size emulsion contains an organic silanol admixed therewith, followed by a selective pyrolysis treatment effecting only the removal of the polymeric size and leaving the silanol on the fibers, after which the so treated fibers are impregnated with a resinifiable mix.

The following examples are submitted to illustrate but not to limit this invention.

*Example I*

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33-37 Kauri-Butanol value (reference scale: Benzene-100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poises at 50% NVM in Varsol solution and the non-volatile portion thereof had an average molecular weight of about 2,000.

A resinifiable polymer mix was prepared by adding 50 parts of the polymeric oil described above, 50 parts of vinyl toluene, 1 part dicumyl peroxide, and 1 part ditertiary butyl peroxide.

A size emulsion was formed comprising 1% of butyl rubber (99% isobutylene copolymerized with 1% isoprene), 0.05% of Alipal CO-433 emulsifier (sodium salt of sulfated alkyl phenoxy polyoxyethylene ethanol) and 0.01% monosodium phosphate in an aqueous dispersion. Glass fibers having clean surfaces (untreated) were coated with the size solution to incorporate 0.5% of the polymer on its surface and subsequently dried at 235° F. for 45 minutes. A laminate was prepared by saturating the glass fibers, with the size coated thereon, and after weaving into cloth, with the polymer mix. The saturated fibers were then placed in a ⅛-inch press mold and cured by baking for 1 hour at 300° F. The reinforced plastic laminate (35% glass) was removed from the mold and subjected to a post cure for 8 hours at 300° F. The end product was somewhat milky which indicated that the butyl rubber had dissolved in the resin and upon reaching a high state of cure, the butyl rubber had partially or wholly precipitated.

A second laminate was prepared with the same polymer mix and was identical to the above-described laminate in all respects except that the butyl was removed by heating at 700° F. for two minutes prior to impregnation with polymeric mix and lamination.

The laminate first prepared, i.e. involving leaving the butyl rubber size on the glass fibers, had a flexural strength determined in accordance with the ASTM Method No. 790-49T of 21,500 p.s.i. and had an opaque appearance. In contrast, the laminate prepared using glass cloth whose fibers were freed of the butyl rubber size before mixing with the same resinifiable mix and which contained 0.15% of hydrolyzed vinyl tris-methoxyethoxysilane had a flexural strength on the same basis, of 56,000 p.s.i. and was translucent in appearance.

*Example II*

An aqueous emulsion comprising 1% butyl rubber similar to that described in Example I, 0.5% by wt. of hydrolyzed vinyl tris-methoxyethoxysilane, 0.1% by wt. of Emulphor-ON emulsifying agent which was a nonionic polyoxyethylated fatty acid was prepared. Drawn glass filaments as formed were then contacted with the above-described aqueous emulsion so as to incorporate 0.5% of butyl rubber on the glass fiber surfaces which were then dried at 212° F. and then made into rovings and cloth in conventional manner. Laminate A was prepared by saturating the glass cloth with the size thereon with the polymeric mix of Example I. The saturated glass cloth was then placed in layers in a ⅛″ press mold and cured by baking for 45 minutes at 300° F. under 50 p.s.i. pressure. The reinforced plastic laminate comprising 70% glass was removed from the mold and subjected to a post cure for 3.2 hours at 300° F.

Laminate B was prepared in a manner similar to that described in respect to Laminate A, except that the glass fibers of the glass cloth were subjected to a pyrolysis in order to remove only the butyl rubber size, but to leave the silanol intact on the surfaces of the glass fibers of the cloth. This treatment was at a temperature of 675° F. for 3 minutes. The glass cloth with the butyl rubber only having been pyrolyzed off the surfaces was then impregnated with the polymeric resinifiable mix described in Example I. This cloth was then laminated (Laminate B) and reacted and post cured in a manner identical to that described for Laminate A. The flexural strengths of Laminates A and B were determined by the ASTM Method 790-49T and were as follows:

| Laminate | Flexural strength, p.s.i. | Appearance |
|---|---|---|
| A | 23,000 | Opaque. |
| B | 44,000 | Translucent. |

This example demonstrates that superior results are attainable by selectively removing the butyl rubber size from the fiber glass reinforcing elements before lamination with the resinifiable polymeric mix. Also, the adhesive bond between the resinifiable mix and the glass fibers was considerably improved by reason of the selective removal of the butyl rubber size from the fibers leaving only the silanol finish thereon prior to impregnating the cloth with the resinifiable polymeric mix and curing.

*Example III*

A size solution was prepared comprising 1.2% of polyisobutylene of about 50,000 molecular weight and 0.5% of vinyl trimethoxysilane which had been partially hydrolyzed in petroleum ether. This size solution and dispersion was then coated onto the glass fibers shortly after their initial formation to create about 1% of polyisobutylene on their surfaces, the coated glass fibers being then subsequently dried in an air oven at about 140° F. for about 2 hours. Laminate C was prepared by settling and impregnating several layers of the glass cloth made from these fibers with the size thereon using the same polymeric mix as described in Example I. The final laminate contained 14 plies of glass cloth and the impregnated laminated material was placed in a ⅛″ press mold and cured in a rubber press for 60 minutes at 290° F. The resinifiable plastic laminate (70% glass) was removed from the mold and subjected to a post cure for 24 hours at 300° F.

Laminate D was prepared in a similar fashion to Laminate C except that the polyisobutylene size was selectively removed from the glass fibers, leaving the polysiloxane intact on the surface of the glass fibers by pyrolyzing the polyisobutylene from the coated glass cloth at a temperature of 600° F. for about 10 minutes. The glass cloth so treated to selectively remove the polyisobutylene size and to leave intact the silanol finish was then impregnated and saturated with the polymeric mix described in Example I. The same number (14 plies) of glass cloth were used and the curing and post curing were identical to that employed in preparing Laminate C. The flexural strengths and the laminates were determined by the same ASTM method previously identified, with the following results being obtained:

| Laminate | Flexural strength, p.s.i. | Appearance |
| --- | --- | --- |
| C | 21,000 | Opaque. |
| D | 48,000 | Translucent. |

This comparative example demonstrates the superior results obtained by selectively removing the polyisobutylene size from the glass cloth before impregnating and laminating the silanol treated glass fibers with the butadiene-styrene copolymer-vinyl toluene resinifiable polymeric mix.

A size dispersion was prepared containing 2% of butyl rubber and 0.6% of hydrolyzed vinyl tris-methoxyethoxy silane in an aqueous dispersion. 181 glass cloth which had been heat-cleaned by burning off a starch-oil sizing for about 2 hours was impregnated and saturated with a resinifiable polymeric mix prepared by mixing about 90 grams of a polyester comprising the fumaric acid ester of a glycol prepared by condensing ethylene oxide with diphenylolpropane with about 90 grams of vinyl toluene and using about 1.8 grams of dicumyl peroxide as a curing agent. 14 layers of the aforementioned glass cloth were saturated and cured in a ⅛" mold at a temperature of 275° F. for 1 hour. Post curing of an additional hour at 300° F. was also employed (Laminate E).

Laminate F was prepared in a manner identical to that of Laminate E, except that prior to impregnating the glass cloth layers with the polyester resinifiable mix the glass cloth was treated at a temperature of about 700° F. for about 4 minutes in order to selectively pyrolyze the butyl rubber leaving the vinyl silane intact on the surfaces of the glass fibers. Subsequent to this operation, the so-treated glass cloth was saturated and impregnated with the polymeric mix above described and curing operations carried out as described in connection with Laminate E. This Laminate F was also tested for its flexural strength and appearance. The laminates of this example had the following flexural strengths and appearance:

| Laminate | Flexural strength, p.s.i. | Appearance |
| --- | --- | --- |
| E | 30,000 | Opaque. |
| F | 53,000 | Slightly opaque. |

A comparative laminate was also tested in which the silane above-described was not placed in the aqueous size dispersion, but the polyester resinifiable mix had added to it the same silane in the amount of 0.8% so that the fibers of the heat cleaned glass cloth were initially treated with the 2% butyl rubber aqueous dispersion, oven dried and finally subjected to a temperature of 900° F. for 1 minute to completely pyrolyze the butyl rubber from the glass fibers. The glass cloth thus cleaned was treated with the silane-polyester resinifiable mix, laminated, cured and post cured as described in connection with Laminates E and F. It was found to have a flexural strength of 57,000 p.s.i. and was of slightly opaque appearance.

Glass cloth whose fibers were originally treated with the conventional starch-oil size in conventional manner was air dried and subjected to a temperature of 1,600° F. for 5 seconds to burn off the size, after which it was treated with the same polyester resinifiable mix, laminated in the same manner as in connection with the foregoing laminates of this example, cured and post cured in an identical manner. This laminate had a flexural strength of 45,000 p.s.i.

These data show that the use of starch-oil size on glass fibers result ultimately in an inferior resinified laminate, due in all probability to the incomplete removal of the starch by the heat treatment and thus to a loss of bonding strength between the glass fibers and the resinifiable mix. The foregoing starch-oil size laminate was compared to a similar laminate prepared in an identical manner to that of the starch-oil size laminate, except that the polymeric resinifiable polyester mix contained 0.8% of vinyl trismethoxyethoxysilane. This cured laminate had a flexural strength of 52,000 p.s.i. The high temperature necessary to remove the starch-oil injured the strength of the glass. Furthermore, the glass fibers were in turn rendered somewhat brittle by the heat treatment and residual amounts of carbon were retained on their surfaces. By employing vinyl silane in connection with the polyester mix a laminate of poor flexural strength was produced. It had a higher flexural strength than when no silane was used.

Having thus described the general nature and character of the invention what is desired to be secured by Letters Patent is:

1. A resinifiable thermosetting reinforced resin composition comprising a resinifiable thermosetting resin mix containing siliceous fibrous materials whose surfaces contain an alkenyl silanol remaining after the complete removal from an initial coating mixture of an alkenyl silanol and a polymeric size selected from the group consisting of the homopolymers of a $C_4$ to $C_7$ isoolefin and the copolymers of at least 70 wt. percent of a $C_4$ to $C_7$ isoolefin with up to 30 wt. percent of a $C_4$ to $C_{10}$ conjugated diolefin, of the said polymeric size only, by pyrolysis at a temperature between about 500° and about 800° F. for between about 2 minutes and about 5 seconds respectively.

2. A composition as in claim 1 wherein butyl rubber is the polymeric size.

3. A composition as in claim 1 wherein polyisobutylene is the polymeric size.

4. In a process of producing a resinifiable, thermosetting, reinforced, resin composition involving the impregnation, with a resinifiable thermosetting mix, of siliceous fibrous materals, the improvement comprising initially treating the surfaces of said fibrous materials with a mixture of an alkenyl silanol and a polymeric size selected from the group consisting of the homopolymers of a $C_4$ to $C_7$ isoolefin and copolymers of at least 70 wt. percent of a $C_4$ to $C_7$ isoolefin with up to 30 wt. percent of a $C_4$ to $C_{10}$ conjugated diolefin and completely removing the said size by pyrolysis prior to carrying out said impregnation step.

5. A process as in claim 4 wherein the resinifiable thermosetting mix contains an alkenyl silanol.

6. A process as in claim 4 wherein the siliceous fibrous materials are glass fibers.

7. A process as in claim 4 wherein the siliceous fibrous materials are treated with a mixture of said polymeric size and an alkenyl silanol and the said polymeric size only is selectively removed by pyrolysis carried out at a temperature of between about 500° and about 800° F. for between about 2 minutes and about 5 seconds, respectively.

8. A process as in claim 4 wherein the polymeric size is butyl rubber.

9. A process as in claim 7 wherein the polymeric size is butyl rubber and the siliceous fibrous materials are glass fibers.

10. A process as in claim 4 wherein the polymeric size is polyisobutylene.

11. A process as in claim 7 wherein the polymeric size is polyisobutylene and the siliceous fibrous materials are glass fibers.

References Cited by the Examiner

UNITED STATES PATENTS

| | | | |
|---|---|---|---|
| 2,468,086 | 4/1949 | Lantham et al. | 117—126 |
| 2,513,268 | 6/1950 | Steinman | 117—126 |
| 2,608,499 | 8/1952 | Straka. | |
| 2,732,883 | 1/1956 | Morrison et al. | 117—126 |
| 2,765,241 | 10/1956 | Wayne | 117—122 |
| 2,845,364 | 7/1958 | Waggoner | 117—54 XR |
| 2,891,885 | 6/1959 | Brooks | 156—314 |
| 2,892,972 | 6/1959 | Ross. | |
| 2,952,576 | 9/1960 | Wheelock et al. | 161—231 XR |

EARL M. BERGERT, *Primary Examiner.*